(12) United States Patent
Ingram et al.

(10) Patent No.: US 6,247,423 B1
(45) Date of Patent: Jun. 19, 2001

(54) ANTENNA COVER APPARATUS

(76) Inventors: Susan A. Ingram; Fred E. Benefield, both of 237 Sherwood Dr., Gadsden, AL (US) 35904

( * ) Notice: Subject to any disclaimer, the term of this patent is extended or adjusted under 35 U.S.C. 154(b) by 0 days.

(21) Appl. No.: 09/506,493

(22) Filed: Feb. 18, 2000

(51) Int. Cl.[7] ........................................ G09F 21/04
(52) U.S. Cl. ........................ 116/28 R; 116/209; 40/591
(58) Field of Search .................. 116/28 R, 209, 116/173; 40/591, 592; 428/31

(56) References Cited

U.S. PATENT DOCUMENTS

| | | |
|---|---|---|
| D. 383,137 | 9/1997 | Gamble, Jr. et al. . |
| D. 387,772 | 12/1997 | Steinberg . |
| D. 390,567 | 2/1998 | Gamble, Jr. et al. . |
| D. 404,739 | 1/1999 | Augusta . |
| 3,036,545 * | 5/1962 | Legg .................................. 116/28 R |
| 4,788,550 | 11/1988 | Chadima, Jr. . |
| 4,876,981 * | 10/1989 | Barnhart .............................. 116/28 R |
| 4,960,067 * | 10/1990 | Currie ................................ 116/28 R |
| 4,964,360 * | 10/1990 | Henry ................................. 116/28 R |
| 4,972,795 | 11/1990 | Mace . |
| 4,978,964 | 12/1990 | Castille . |
| 4,989,536 * | 2/1991 | Liming et al. ...................... 116/28 R |
| 5,078,075 * | 1/1992 | Liming et al. ...................... 116/28 R |
| 5,572,225 * | 11/1996 | McCarthy ........................... 116/28 R |
| 5,665,438 | 9/1997 | Lee et al. . |
| 5,735,230 | 4/1998 | Romesburg . |
| 5,836,261 | 11/1998 | Sutton . |

FOREIGN PATENT DOCUMENTS 2037467  7/1980 (GB) .

* cited by examiner

*Primary Examiner*—Andrew H. Hirshfeld
(74) *Attorney, Agent, or Firm*—Richard C. Litman

(57) ABSTRACT

An antenna cover apparatus for securement to a vertically oriented antenna of an associated vehicle. The antenna cover apparatus includes an exterior casing portion, an insert apparatus, and at least one streamer portion. The exterior casing portion is configured in the shape of a sports helmet and defines an interior cavity for promoting a favorite sports team. The insert apparatus is snugly fitted inside of said interior cavity for enabling said novel antenna cover apparatus to be slid onto the antenna. At least one streamer portion is attached to said insert portion for adding flare to said antenna cover apparatus to provide a more eye-catching promotion than conventional antenna covers.

4 Claims, 5 Drawing Sheets

ANTENNA COVER APPARATUS

BACKGROUND OF THE INVENTION

1. Field of the Invention

The present invention relates generally to ornaments installable on motor vehicle antennas and, more specifically, to a sports helmet-shaped ornament for a motor vehicle antenna.

2. Description of the Related Art

The ornament of the present invention preferably has a football helmet configuration, although other configurations are possible. My invention concerns primarily a mechanism for quickly and easily attaching a sports helmet-shaped ornament to a conventional automobile antenna without special tools or adhesives. The attachment mechanism is designed so that the ornament body can be easily and quickly removed from the antenna, without harm to the antenna. Ornaments embodying this invention can be manufactured at relatively low cost; consequently such ornaments can have a relatively small overall volume, such that-charges for packaging, transportation and point-of-sale display can be relatively low.

Several patents disclose various ornaments for automobile antennas. For example, U.S. Pat. No. Des. 383,137 issued on Sep. 2, 1997 to Eddie Gamble, Jr. et al. describes an ornamental design for an automobile antenna ornament. U.S. Pat. No. Des. 387,772 issued on Dec. 16, 1997 to Dale A. Steinberg describes an ornamental design of a football for an antenna topper. U.S. Pat. No. Des. 390,567 issued on Feb. 10, 1998 to Eddie Gamble, Jr. et al. describes a mask-shaped ornamental design for an automobile antenna ornament. U.S. Pat. No. Des. 404,739 issued on Jan. 26, 1999 to Mark Augusta describes an ornamental design of a football player antenna-topper.

U.S. Pat. No. 4,788,550 issued on Nov. 29, 1988 to George E. Chadima, Jr. describes a front hood ornament antenna. U.S. Pat. No. 4,972,795 issued on Nov. 27, 1990 to Timothy A. Mace describes an antenna marker device for enhancing visibility of an individual's automobile as the device is secured to an uppermost terminal end of the antenna. U.S. Pat. No. 4,978,964 issued on Dec. 18, 1990 to James Castille describes an ornament installable of on an automotive vehicle antenna to achieve a colorful light reflecting effect at night. U.S. Pat. No. 5,665,438 issued on Sep. 9, 1997 to Inita Lee et al. describes an antenna accessory for vehicle identification. U.S. Pat. No. 5,735,230 issued on Apr. 7, 1998 to Daniel R. Romesburg describes an apparatus for supporting flags on automobile antennas. U.S. Pat. No. 5,836,261 issued on Nov. 17, 1998 to Delores M. Sutton describes a vehicle antenna topper. The antenna topper includes an ornamental element which is capable of being secured to the antenna of a vehicle.

However, none of the aforementioned inventions describe an eye-catching antenna cover having a sports team logo imprinted thereon for promoting a favorite sports team. None of the aforementioned inventions describe an antenna cover possessing streamers in a plurality of colors for promoting the colors of a recognized sports team. None of the above inventions and patents, taken either singularly or in combination, is seen to describe the instant invention as claimed. Thus a helmet-shaped antenna cover solving the aforementioned problems is desired.

SUMMARY OF THE INVENTION

The present invention is an antenna cover apparatus for securement to a vertically oriented antenna of an associated vehicle. The antenna cover apparatus includes an exterior casing portion, an insert apparatus, and at least one streamer portion. The exterior casing portion is configured in the shape of a sports helmet and defines an interior cavity for promoting a favorite sports team. The insert apparatus is snugly fitted inside of said interior cavity for enabling the antenna cover apparatus to be slid onto the antenna. The at least one streamer portion is attached to said insert portion for adding flare to said antenna cover apparatus to provide a more eye-catching promotion than conventional antenna covers.

Accordingly, it is a principal object of the invention to provide an eye-catching antenna cover configured to promote a favorite sports team.

It is another object of the invention to provide an antenna cover having an eye-catching design.

It is a further object of the invention to provide an antenna cover that can be easily attached to an automobile antenna.

Still another object of the invention is to provide an antenna cover that is reasonably quiet when an automobile is in motion.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
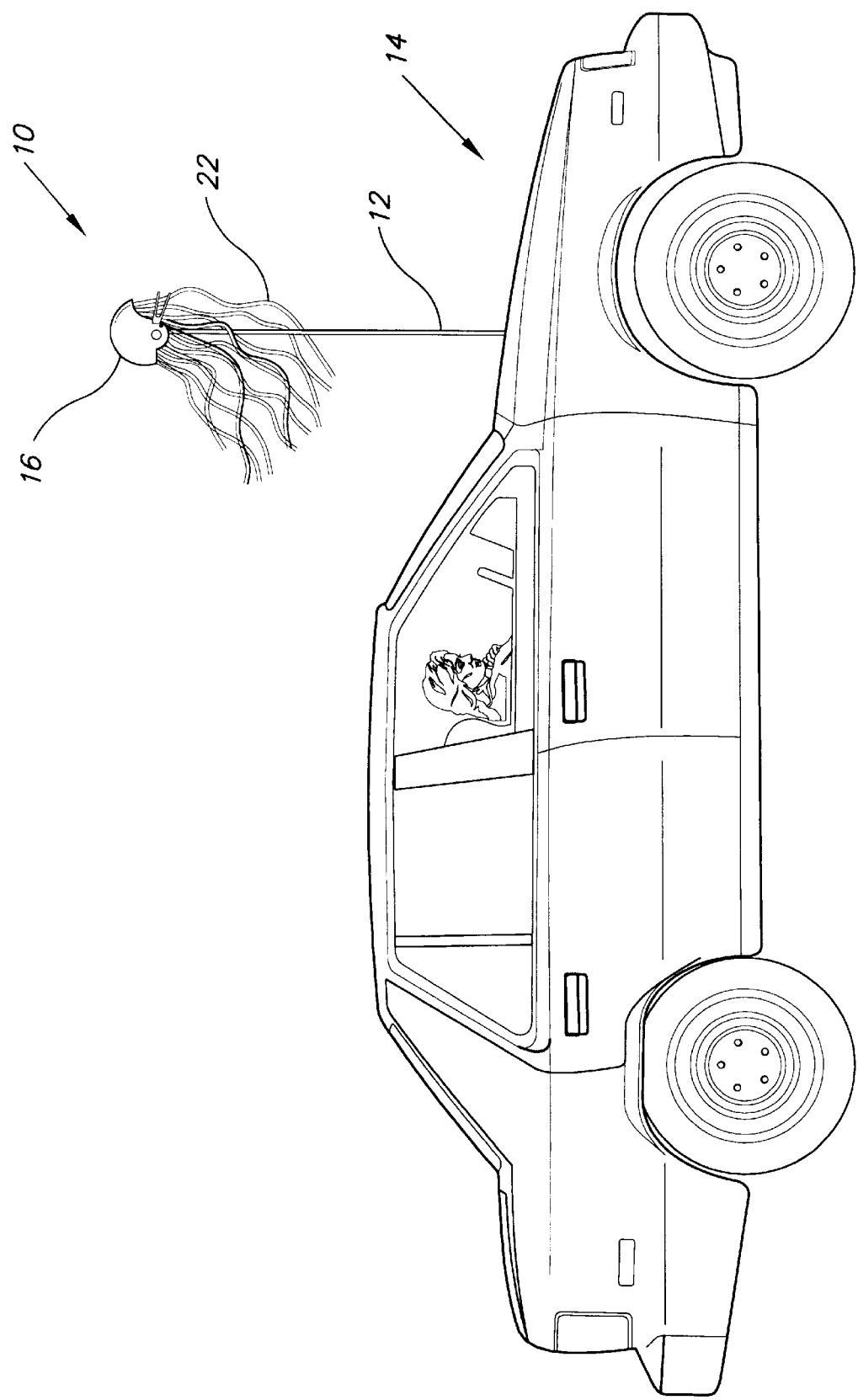
FIG. 1 is an environmental view of a helmet-shaped antenna cover according to a preferred embodiment of the present invention.

The present invention is an antenna cover for promoting a favorite sports team. An environmental view of the antenna cover apparatus 10 according to a preferred embodiment of the present invention is shown in FIG. 1. As shown, the antenna cover apparatus 10 is removably attached to a conventional antenna 12 for an automobile 14.

Figure 2:
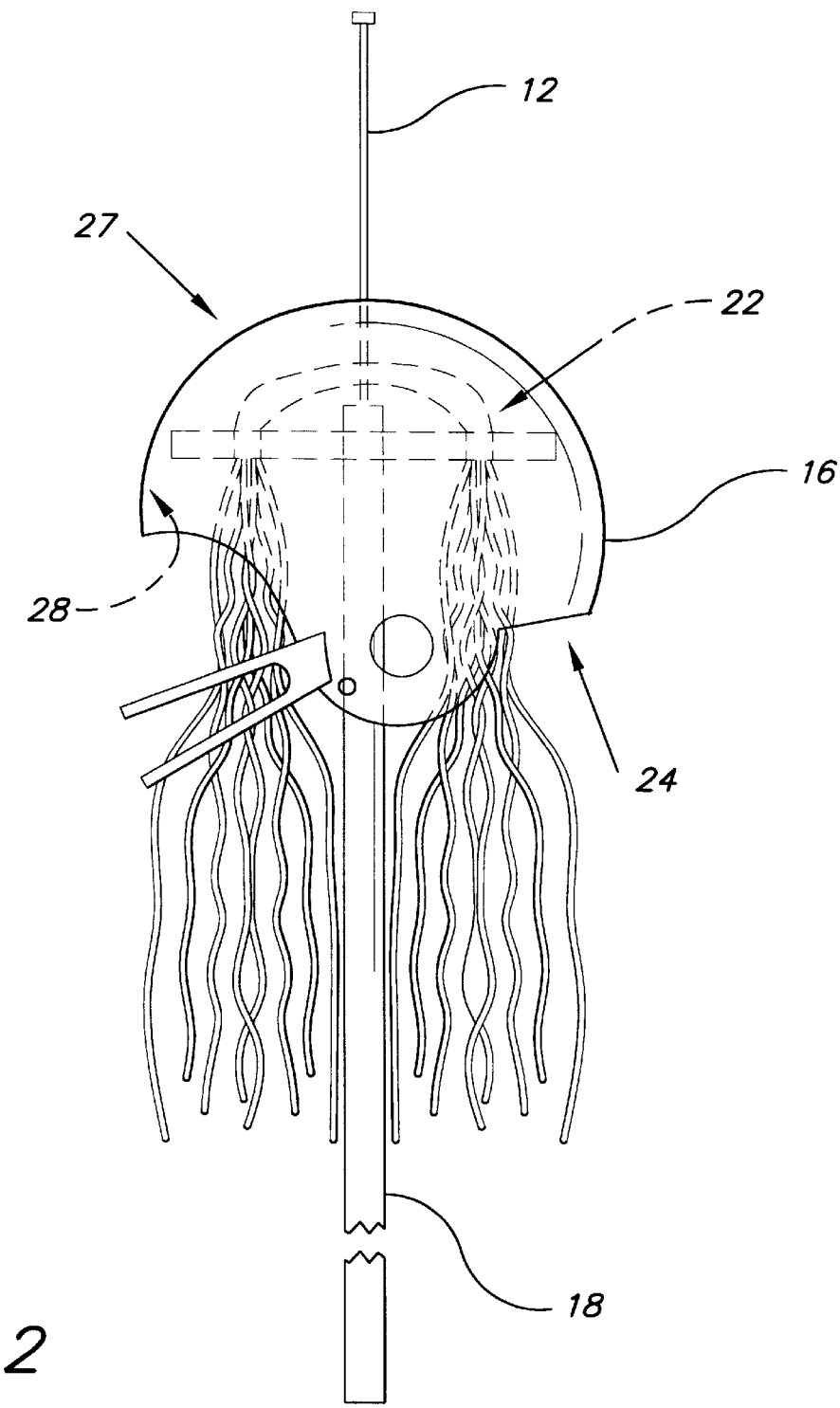
FIG. 2 is an elevation view of the antenna cover according to a preferred embodiment of the present invention.
Figure 3:
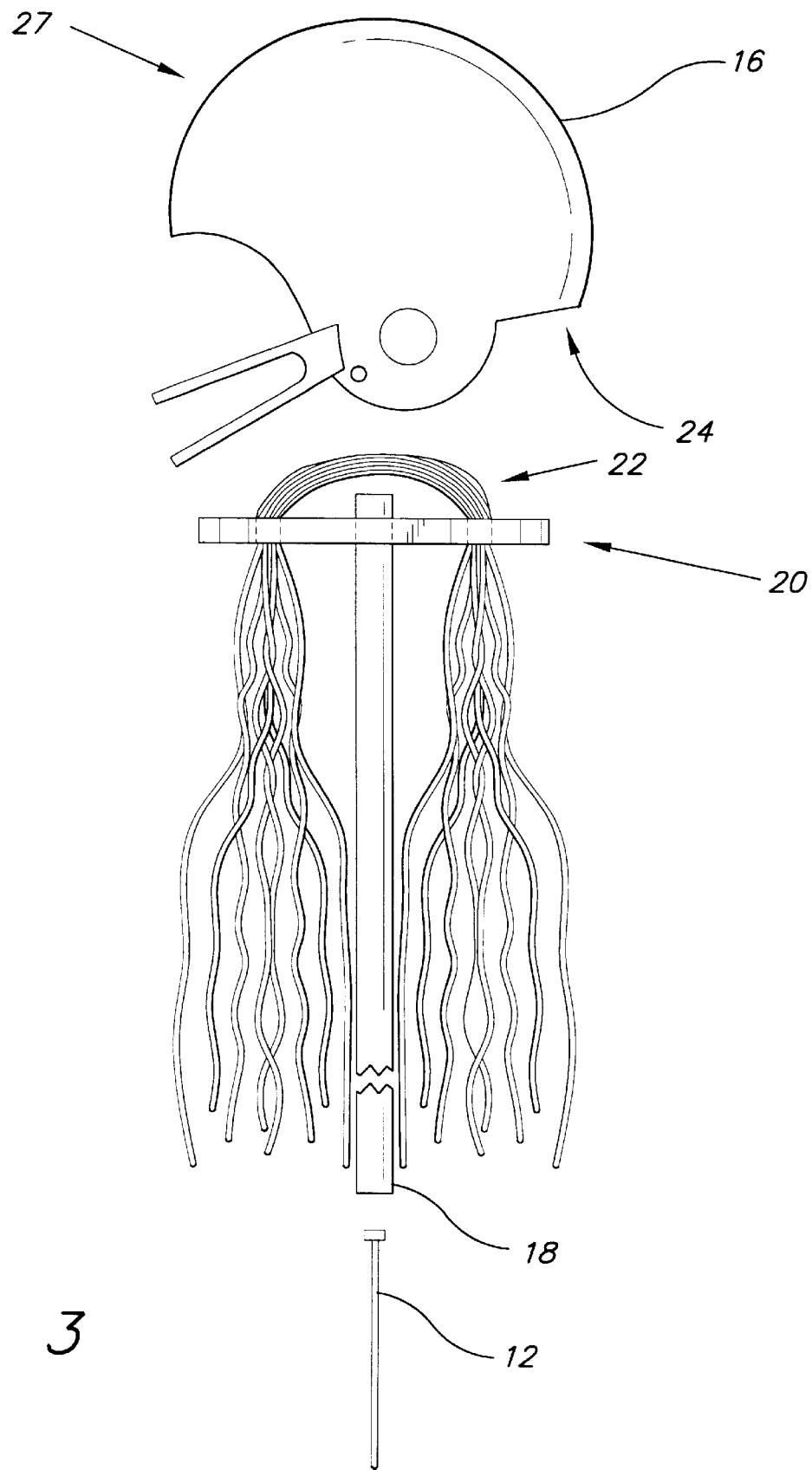
FIG. 3 is an exploded view of the antenna cover of the present invention.
Figure 4:
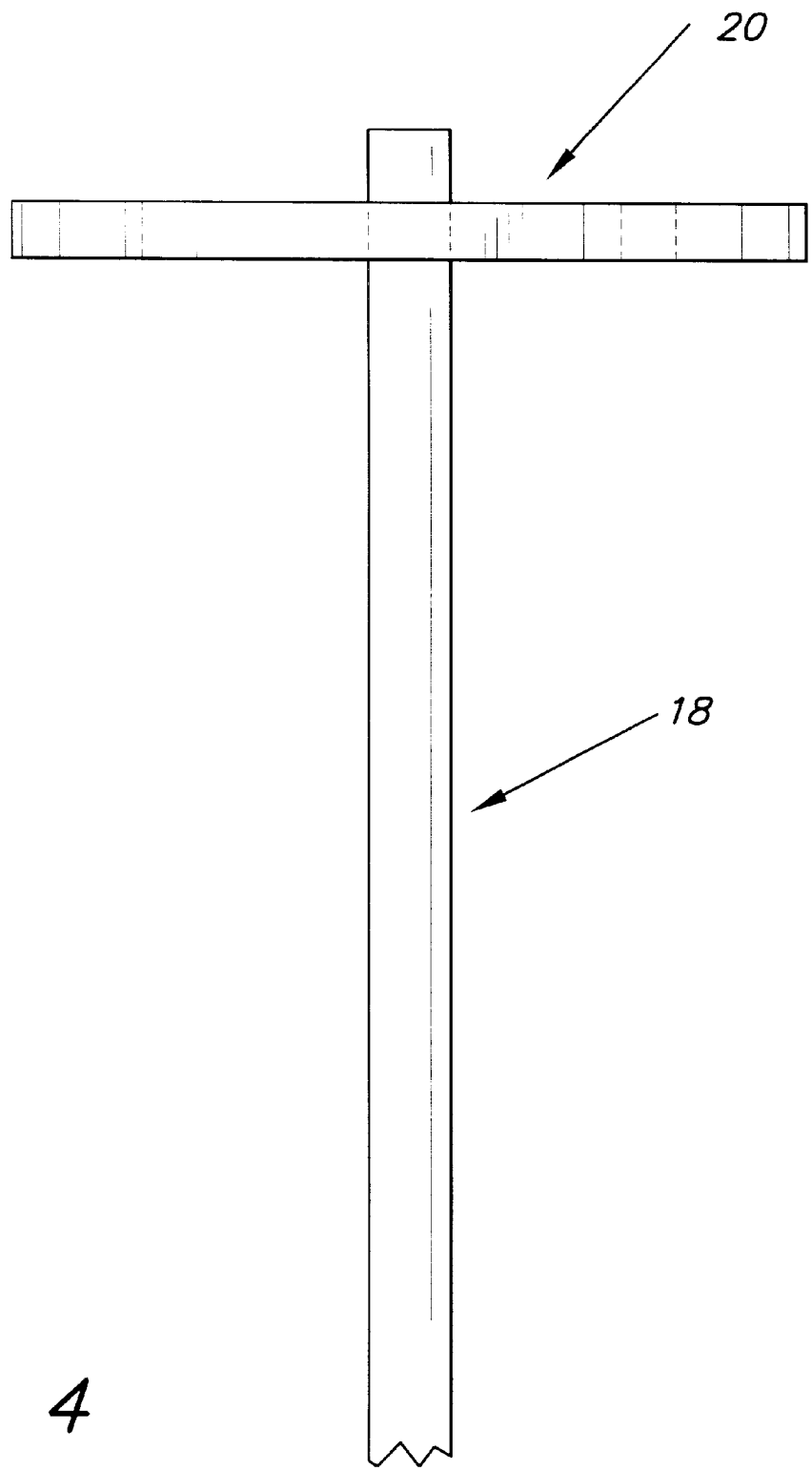
FIG. 4 is an elevation view of an insert and tubing component of the antenna cover according to a preferred embodiment of the invention.
Figure 5:
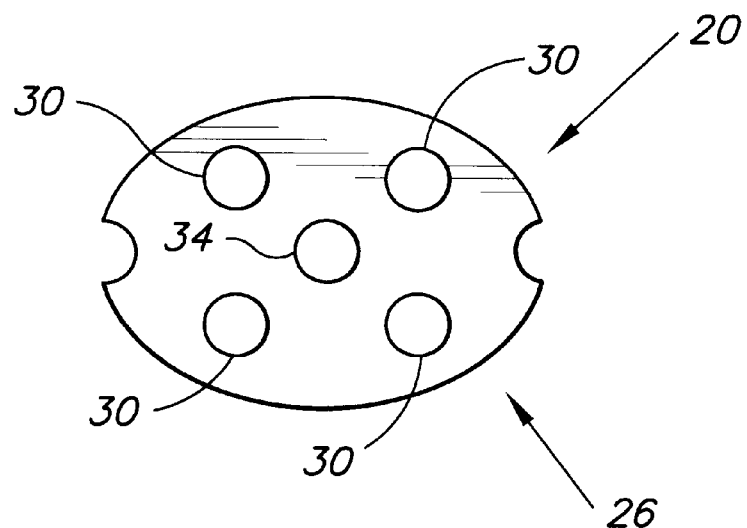
FIG. 5 is a plan view of a top side of the insert.

Preferably, the antenna cover apparatus 10 includes an exterior casing portion 16, a tubing portion 18, an insert portion 20, and at least two streamer portions 22 as best shown in FIG. 2. The streamer portions 22 serve to give the antenna cover apparatus 22 additional flare for promoting a favorite football team. Preferably, the streamer portions 22 contain colors used in the team's uniform to further promote the football team. The streamer portions 22 may be made of a vinyl material to give the streamer portions 22 a lightweight and durable construction.

Figure 6:
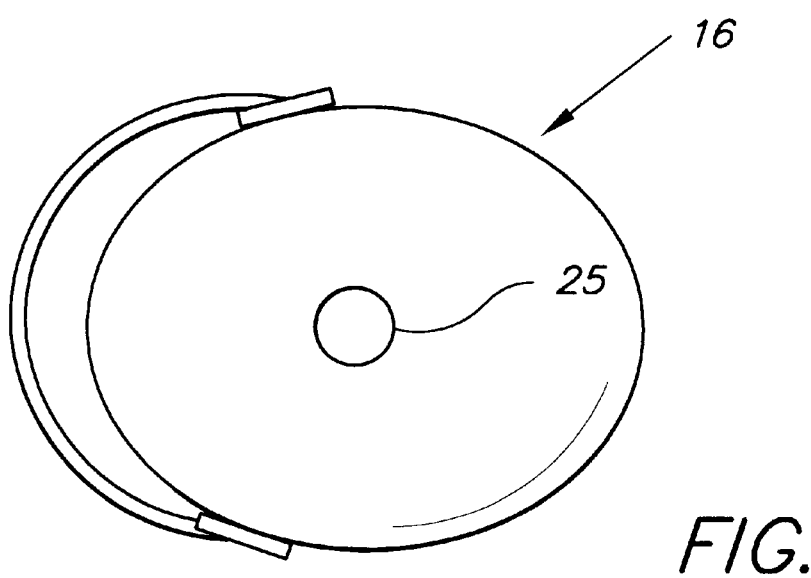
FIG. 6 is a plan view of a top side of a sports team helmet according to the present invention.

As shown, the exterior casing portion 16 is preferably configured in the shape of a football helmet for promoting the sport of football. A team logo used by a well-known football team is preferably imprinted on an outside surface of the exterior casing portion 16 for promoting the football team. The exterior casing portion 16 defines an interior helmet cavity 24 for enabling the insert portion 20 to be snugly received therein. A first hole 25 (shown in FIG. 6) is formed in a top portion 27 of the exterior casing portion 16 for enabling an antenna to be passed through the exterior casing portion 16. The exterior casing portion 16 is preferably made of a plastic material to give the exterior casing portion 16 a lightweight construction.

The insert portion 20 is preferably configured in the shape of a flat plate having an outside boundary 26 that substantially matches the configuration of an inner surface 28 of the exterior casing portion 16 but is slightly smaller in size than the exterior casing portion 16 for enabling the insert portion 20 to fit snugly inside of said interior helmet cavity 24. Preferably, the insert portion 20 is made of a plastic material to give the insert portion 20 a lightweight construction.

Preferably, four second holes 30 are formed in the insert portion 20 for allowing each of two streamer portions 22 to be threadedly attached to the insert portion 20 (by threading each streamer through two of the second holes 30). Each second hole 30 is preferably positioned equidistant from the center of the insert portion 20 for allowing the streamer portions 22 to be threaded evenly around the insert portion 20. Accordingly, a first one of the two streamer portions 22 may be threaded through a first pair of the second holes 30 to threadedly attach the first of the two streamer portions 22 to the insert portion. Likewise, a second one of the two streamer portions 22 is threaded through the second pair of second holes 30 to threadedly attached the second of the two streamer portions 22 to the insert portion 20.

A third hole 34 having a diameter is formed in the center of the insert portion 20 for enabling a tubing portion 18 to be inserted into the insert portion 20. The tubing portion 18 has an outside diameter that is marginally less than the diameter of the third hole 34 for enabling the tubing portion 18 to fit snugly inside the third hole 34. Accordingly, the tubing portion 18 is snugly inserted into the third hole 34 to securely attach the tubing portion 18 to the insert portion 20. A conventional glue is preferably added to the juncture of the tubing portion 18 and the insert portion 20 to more securely attach the insert portion 20 to the tubing portion 18.

The exterior casing portion 16 may be slid over the insert portion 20 to attach the exterior casing portion 16 to the insert portion 20. The exterior casing portion 16 must be aligned such that the first hole 25 lies vertically above and is concentric with the tubing portion 18 so the antenna apparatus 10 may be slid over a conventional antenna 12. Optionally, conventional glue may be applied to the juncture of the insert portion 20 and the exterior casing portion 16 to fixedly attach the insert portion 20 to the exterior casing portion 16.

It is to be understood that the present invention is not limited to the embodiments described above, but encompasses any and all embodiments within the scope of the following claims.

I claim:

1. An antenna cover apparatus for securement to a vertically oriented antenna of an associated vehicle, comprising:

an exterior casing portion defining an interior cavity, said exterior casing portion having a first center hole and being configured in the shape of a sports helmet for promoting a sports team;

an insert portion snugly fitted within the interior cavity of said exterior casing portion said insert portion having formed therein a second center hole aligned with the first center hole and a plurality of first holes positioned equidistant from the second center hole;

at least one streamer portion threadedly attached to said insert portion through said plurality of first holes for adding flare to said antenna cover apparatus; and a tubing portion securely inserted in the second center hole of said insert for stably supporting said antenna cover apparatus around an antenna.

2. The antenna cover apparatus recited in claim 1, wherein said sports helmet is a football helmet.

3. The antenna cover apparatus recited in claim 1, wherein said tubular portion defines an outer diameter and the second center hole of said insert portion defines a second diameter, said outer diameter being marginally less than said second diameter.

4. The antenna cover apparatus recited in claim 3 glue is applied to a juncture between said tubing portion and said insert portion.

* * * * *